US008344968B2

(12) United States Patent
Huh

(10) Patent No.: US 8,344,968 B2
(45) Date of Patent: Jan. 1, 2013

(54) PLASMA DISPLAY APPARATUS

(75) Inventor: Yonghyun Huh, Gyoungsangbuk-do (KR)

(73) Assignee: LG Electronics Inc., Seoul (KR)

( * ) Notice: Subject to any disclaimer, the term of this patent is extended or adjusted under 35 U.S.C. 154(b) by 613 days.

(21) Appl. No.: 12/499,229

(22) Filed: Jul. 8, 2009

(65) Prior Publication Data

US 2010/0123709 A1 May 20, 2010

(30) Foreign Application Priority Data

Nov. 19, 2008 (KR) ........................ 10-2008-0114986

(51) Int. Cl.
*G09G 3/28* (2006.01)
*G09G 5/00* (2006.01)
*G06F 3/033* (2006.01)

(52) U.S. Cl. .......................................... 345/60; 345/204

(58) Field of Classification Search ........................ None
See application file for complete search history.

(56) References Cited

U.S. PATENT DOCUMENTS

| | | | | |
|---|---|---|---|---|
| 6,294,875 | B1 * | 9/2001 | Kurata et al. | 315/169.1 |
| 2003/0122738 | A1 * | 7/2003 | Lee | 345/60 |
| 2006/0050019 | A1 * | 3/2006 | Kim | 345/60 |
| 2007/0008248 | A1 * | 1/2007 | Jung et al. | 345/67 |
| 2007/0268284 | A1 * | 11/2007 | Kim et al. | 345/211 |
| 2008/0122742 | A1 * | 5/2008 | Huh et al. | 345/60 |
| 2009/0128537 | A1 * | 5/2009 | Cho et al. | 345/212 |

* cited by examiner

*Primary Examiner* — Amare Mengistu
*Assistant Examiner* — Antonio Xavier
(74) *Attorney, Agent, or Firm* — Fish & Richardson P.C.

(57) ABSTRACT

A plasma display apparatus is disclosed. The plasma display apparatus includes a plasma display panel including a scan electrode and a sustain electrode that are positioned parallel to each other, and an address electrode crossing the scan electrode and the sustain electrode and a driver that supplies a reset signal to the scan electrode and supplies a first signal, whose a direction is the same as a direction of the reset signal, to the sustain electrode in a reset period of at least one of a plurality of subfields of a frame. The first signal overlaps a predetermined period during which the reset signal rises to a maximum voltage and then again rises to a voltage less than the maximum voltage.

17 Claims, 13 Drawing Sheets

(a) (b)

| Δt1 | Amount of wall charges | Driving time |
|---|---|---|
| 20ns | × | ◎ |
| 50ns | ○ | ◎ |
| 100ns | ◎ | ◎ |
| 150ns | ◎ | ◎ |
| 200ns | ◎ | ◎ |
| 250ns | ○ | ◎ |
| 300ns | × | ○ |
| 400ns | × | × |

PLASMA DISPLAY APPARATUS

This application claims the benefit of Korea Patent Application No. 10-2008-0114986 filed on Nov. 19, 2008, the entire contents of which is incorporated herein by reference for all purposes as if fully set forth herein.

BACKGROUND

1. Field

Embodiments relate to a plasma display apparatus.

2. Description of the Background Art

A plasma display apparatus includes a plasma display panel. The plasma display panel includes a phosphor layer inside discharge cells partitioned by barrier ribs and a plurality of electrodes.

When driving signals are applied to the electrodes of the plasma display panel, a discharge occurs inside the discharge cells. More specifically, when the discharge occurs in the discharge cells by applying the driving signals to the electrodes, a discharge gas filled in the discharge cells generates vacuum ultraviolet rays, which thereby cause phosphors between the barrier ribs to emit visible light. An image is displayed on the screen of the plasma display panel using the visible light.

SUMMARY

In one aspect, there is a plasma display apparatus comprising a plasma display panel including a scan electrode and a sustain electrode that are positioned parallel to each other, and an address electrode crossing the scan electrode and the sustain electrode and a driver that supplies a reset signal to the scan electrode and supplies a first signal, whose a direction is the same as a direction of the reset signal, to the sustain electrode in a reset period of at least one of a plurality of subfields of a frame, wherein the first signal overlaps a predetermined period during which the reset signal rises to a maximum voltage and then again rises to a voltage less than the maximum voltage.

In another aspect, there is a plasma display apparatus comprising a plasma display panel including a scan electrode and a sustain electrode that are positioned parallel to each other, and an address electrode crossing the scan electrode and the sustain electrode and a driver that supplies a first reset signal to the scan electrode and supplies a first signal, whose a direction is the same as a direction of the first reset signal, to the sustain electrode in a reset period of a first subfield of a plurality of subfields of a frame, and supplies a second reset signal, whose a voltage magnitude is smaller than a voltage magnitude of the first reset signal, to the scan electrode and supplies the first signal, whose a direction is the same as a direction of the second reset signal, to the sustain electrode in a reset period of a second subfield following the first subfield, wherein the first signal overlaps a predetermined period during which each of the first and second reset signals rises to a maximum voltage and then again rises to a voltage less than the maximum voltage.

In still one aspect, there is a plasma display apparatus comprising a plasma display panel including a scan electrode and a sustain electrode that are positioned parallel to each other, and an address electrode crossing the scan electrode and the sustain electrode and a driver that supplies a reset signal to the scan electrode and supplies a first signal overlapping the reset signal to the sustain electrode in a reset period of at least one of a plurality of subfields of a frame, wherein the reset signal includes a ramp-up signal, whose a voltage gradually rises in a setup period of the reset period, and a ramp-down signal, whose a voltage gradually falls in a set-down period following the setup period, wherein an erase period is arranged between the setup period and the set-down period, wherein during the erase period, the reset signal falls to a first voltage, that is less than a maximum voltage of the ramp-up signal and is greater than a ground level voltage, and then again rises to a second voltage less than the maximum voltage of the ramp-up signal, wherein the first signal overlaps the erase period.

Further scope of applicability of the invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS

Reference will now be made in detail embodiments of the invention examples of which are illustrated in the accompanying drawings.

Figure 1:
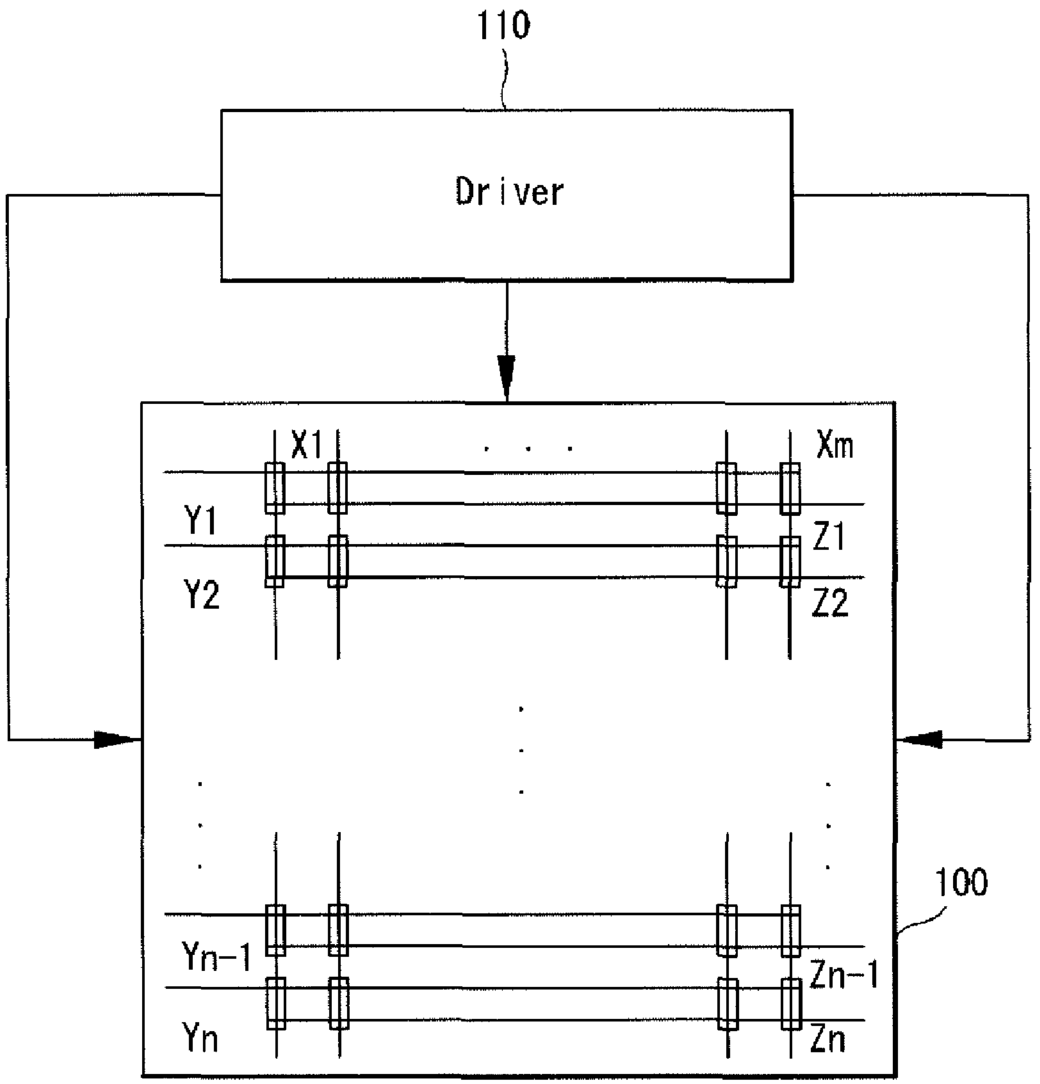
FIG. 1 illustrates an exemplary configuration of a plasma display apparatus according to an embodiment.

FIG. 1 illustrates an exemplary configuration of a plasma display apparatus according to an embodiment.

As shown in FIG. 1, the plasma display apparatus according to the exemplary embodiment includes a plasma display panel 100 and a driver 110.

The plasma display panel 100 includes scan electrodes Y1 to Yn and sustain electrodes Z1 to Zn positioned parallel to each other, and address electrodes X1 to Xm positioned to cross the scan electrodes Y1 to Yn and the sustain electrodes Z1 to Zn.

The driver 110 displays an image on the plasma display panel 100 in a frame including a plurality of subfields. More specifically, the driver 110 supplies driving signals to at least one of the scan electrodes Y1 to Yn, the sustain electrodes Z1 to Zn, or the address electrodes X1 to Xm to thereby display an image on the screen of the plasma display panel 100.

For example, during a reset period of at least one of a plurality of subfields of a frame, the driver 110 supplies a reset signal to the scan electrode and supplies a first signal overlapping the reset signal to the sustain electrode and thus may generate an erase discharge in the discharge cells.

Although FIG. 1 shows the driver 110 formed in the form of a signal board, the driver 110 may be formed in the form of a plurality of boards depending on the electrodes of the plasma display panel 100. For example, the driver 110 may include a first driver (not shown) for driving the scan electrodes Y1 to Yn, a second driver (not shown) for driving the sustain electrodes Z1 to Zn, and a third driver (not shown) for driving the address electrodes X1 to Xm.

Figure 2:
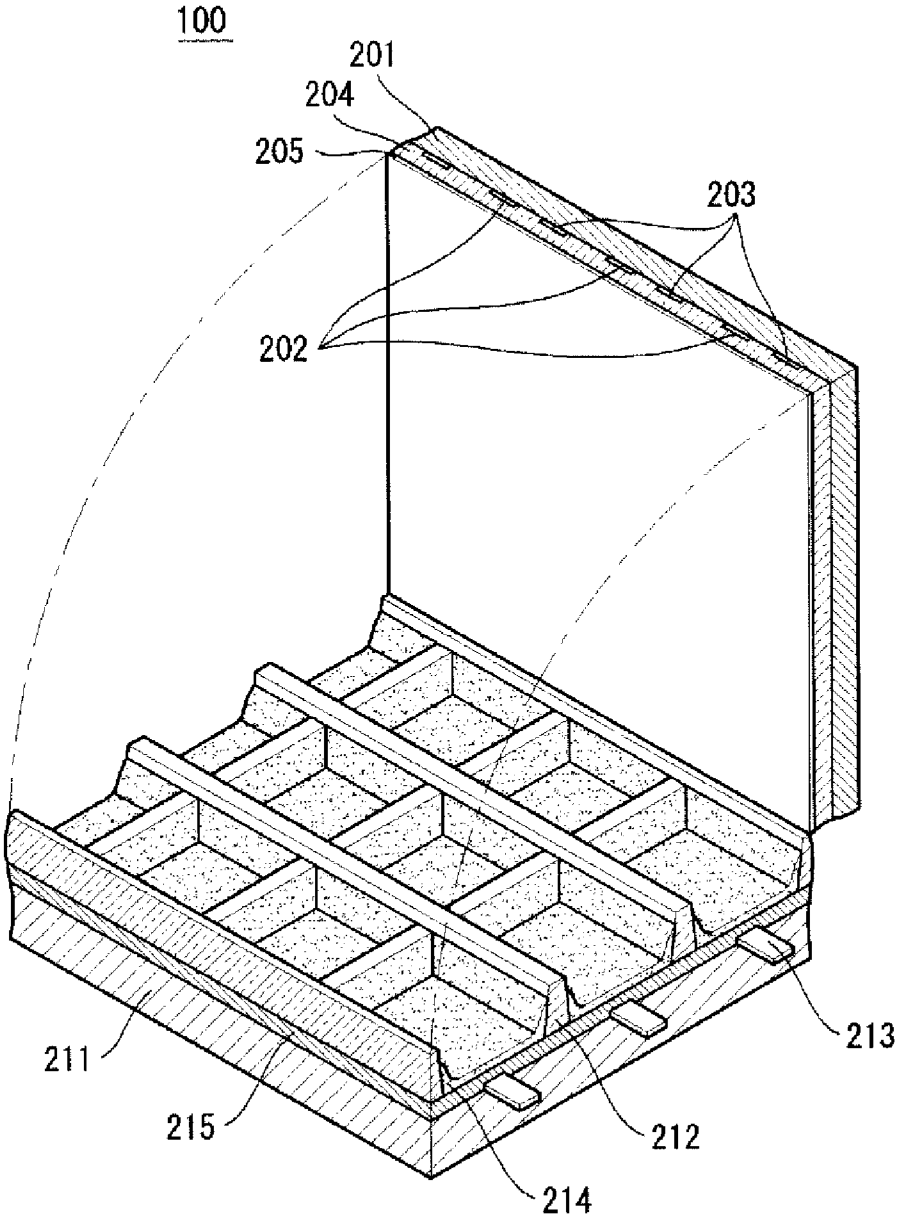
FIG. 2 illustrates an exemplary structure of a plasma display panel.

FIG. 2 illustrates an exemplary structure of the plasma display panel 10.

As shown in FIG. 2, the plasma display panel may include a front substrate 201, on which a scan electrode 202 and a sustain electrode 203 are formed substantially parallel to each other, and a rear substrate 211 on which an address electrode 213 is formed to cross the scan electrode 202 and the sustain electrode 203.

An upper dielectric layer 204 may be formed on the scan electrode 202 and the sustain electrode 203 to limit a discharge current of the scan electrode 202 and the sustain electrode 203 and to provide insulation between the scan electrode 202 and the sustain electrode 203. A protective layer 205 may be formed on the upper dielectric layer 204 to facilitate discharge conditions. The protective layer 205 may be formed of a material having a high secondary electron emission coefficient, for example, magnesium oxide (MgO).

A lower dielectric layer 215 may be formed on the address electrode 213 to provide insulation between the address electrodes 213.

Barrier ribs 212 of a stripe type, a well type, a delta type, a honeycomb type, etc. may be formed on the lower dielectric layer 215 to partition discharge spaces (i.e., discharge cells). Hence, a first discharge cell emitting red light, a second discharge cell emitting blue light, and a third discharge cell emitting green light, etc. may be formed between the front substrate 201 and the rear substrate 211. The address electrode 213 may cross the scan electrode 202 and the sustain electrode 203 in one discharge cell. Namely, each discharge cell is formed at a crossing of the scan electrode 202, the sustain electrode 203, and the address electrode 213.

The barrier rib 212 may have various forms of structures as well as a structure shown in FIG. 2. For example, the barrier rib 212 includes a first barrier rib 212*b* and a second barrier rib 212*a*. The barrier rib 212 may have a differential type barrier rib structure in which heights of the first and second barrier ribs 212*b* and 212*a* are different from each other, a channel type barrier rib structure in which a channel usable as an exhaust path is formed on at least one of the first barrier rib 212*b* or the second barrier rib 212*a*, a hollow type barrier rib structure in which a hollow is formed on at least one of the first barrier rib 212*b* or the second barrier rib 212*a*, and the like.

In the differential type barrier rib structure, a height of the first barrier rib 212*b* may be smaller than a height of the second barrier rib 212*a*. In the channel type barrier rib structure, a channel may be formed on the first barrier rib 212*b*.

Each of the discharge cells partitioned by the barrier ribs 212 may be filled with a predetermined discharge gas.

A phosphor layer 214 may be formed inside the discharge cells to emit visible light for an image display during an address discharge. For example, first, second, and third phosphor layers that respectively generate red, blue, and green light may be formed inside the discharge cells.

While the address electrode 213 may have a substantially constant width or thickness, a width or thickness of the address electrode 213 inside the discharge cell may be different from a width or thickness of the address electrode 213 outside the discharge cell. For example, a width or thickness of the address electrode 213 inside the discharge cell may be larger than a width or thickness of the address electrode 213 outside the discharge cell.

When a predetermined signal is supplied to at least one of the scan electrode 202, the sustain electrode 203, and the address electrode 213, a discharge may occur inside the discharge cell. The discharge may allow the discharge gas filled in the discharge cell to generate ultraviolet rays. The ultraviolet rays may be incident on phosphor particles of the phosphor layer 214, and then the phosphor particles may emit visible light. Hence, an image may be displayed on the screen of the plasma display panel 100.

Figure 3:
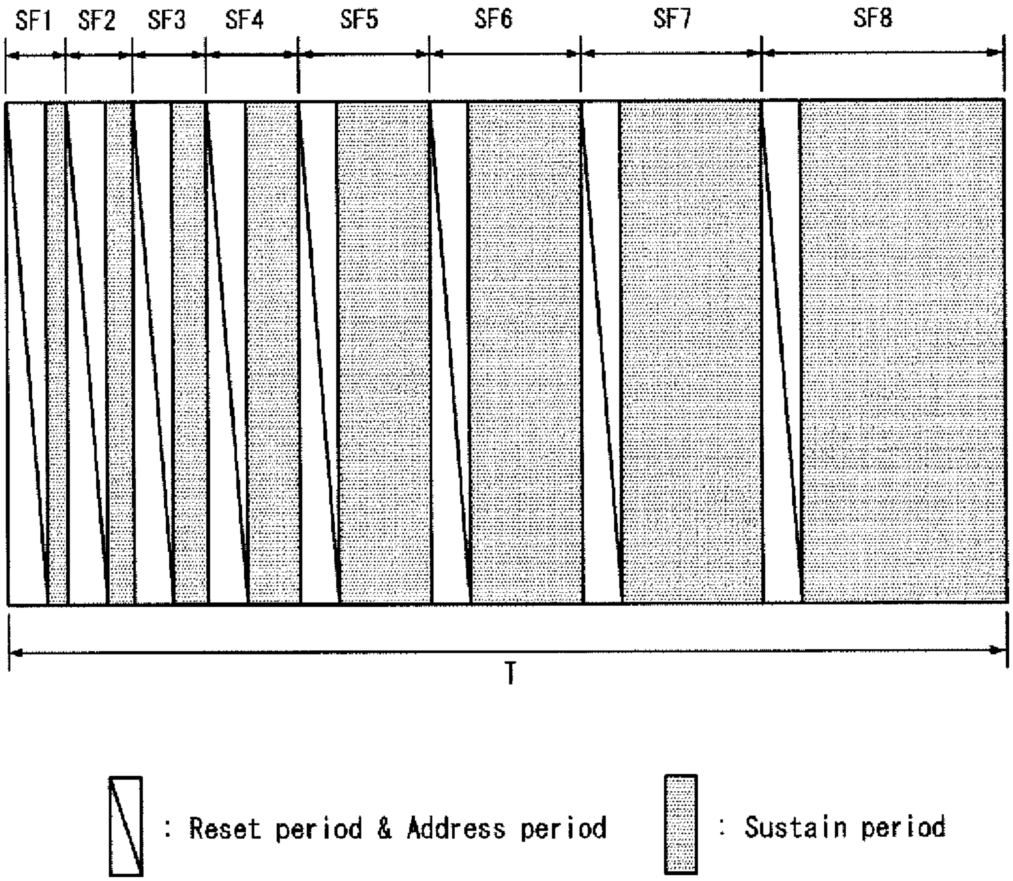
FIG. 3 illustrates a frame for achieving a gray scale of an image.

FIG. 3 illustrates a frame for achieving a gray scale of an image in the plasma display apparatus.

As shown in FIG. 3, a frame for achieving a gray scale of an image may include a plurality of subfields. Each of the plurality of subfields may be divided into an address period and a sustain period. During the address period, the discharge cells not to generate a discharge may be selected or the discharge cells to generate a discharge may be selected. During the sustain period, a gray scale may be achieved depending on the number of discharges.

For example, if an image with 256-gray level is to be displayed, as shown in FIG. 3, a frame may be divided into 8 subfields SF1 to SF8. Each of the 8 subfields SF1 to SF8 may include an address period and a sustain period.

Furthermore, at least one of a plurality of subfields of a frame may further include a reset period for initialization. At least one of a plurality of subfields of a frame may not include a sustain period.

The number of sustain signals supplied during the sustain period may determine a gray level of each of the subfields. For example, in such a method of setting a gray level of a first subfield at 20 and a gray level of a second subfield at 21, the sustain period increases in a ratio of 2n (where, n=0, 1, 2, 3, 4, 5, 6, 7) in each of the subfields. Hence, various gray levels of an image may be achieved by controlling the number of sustain signals supplied during the sustain period of each subfield depending on a gray level of each subfield.

Although FIG. 3 shows that one frame includes 8 subfields, the number of subfields constituting a frame may vary. For example, a frame may include 10 or 12 subfields. Further, although FIG. 3 shows that the subfields of the frame are arranged in increasing order of gray level weight, the subfields may be arranged in decreasing order of gray level weight or may be arranged regardless of gray level weight.

At least one of a plurality of subfields of a frame may be a selective erase subfield or a selective write subfield.

If a frame includes at least one selective erase subfield and at least one selective write subfield, it may be preferable that a first subfield of a plurality of subfields of the frame is a selective write subfield and the other subfields are selective erase subfields. Alternatively, all the subfields of the frame may be selective erase subfields.

In the selective erase subfield, the discharge cell to which a data signal is supplied during an address period is turned off during a sustain period following the address period. In the selective write subfield, the discharge cell to which a data signal is supplied during an address period is turned on during a sustain period following the address period.

Figure 4:
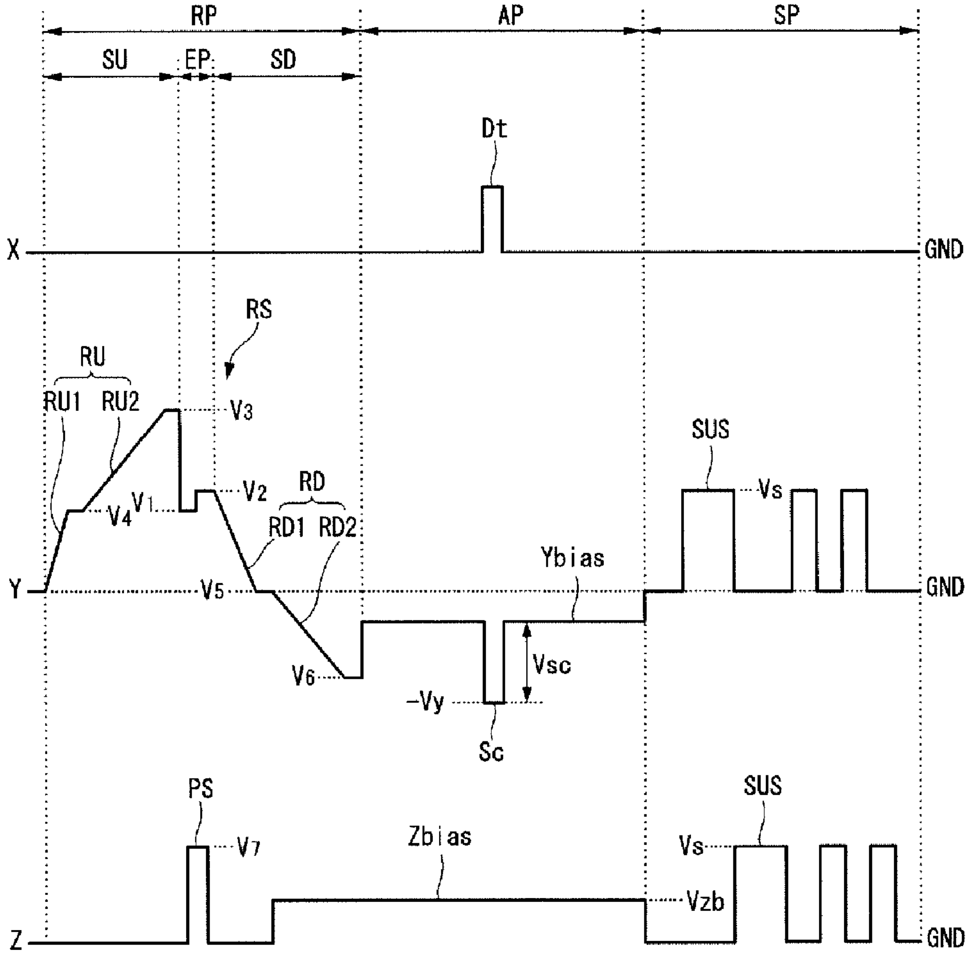
FIGS. 4 to 6 illustrate an exemplary operation of a plasma display apparatus according to an embodiment.
Figure 5:
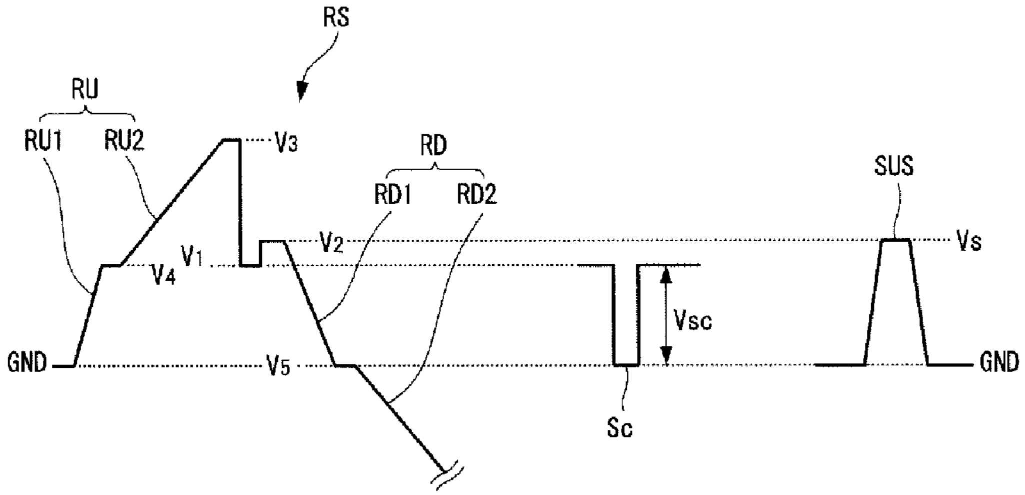
Figure 6:
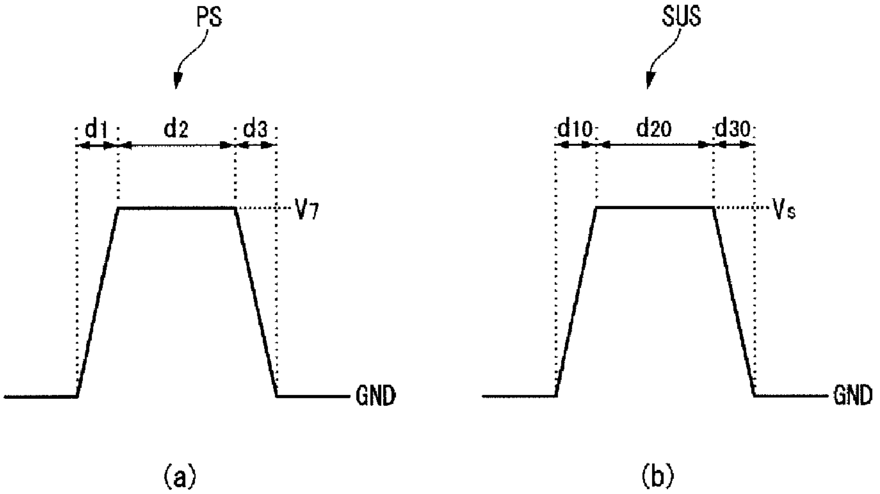

FIGS. 4 to 6 illustrate an exemplary operation of the plasma display apparatus. Driving signals in FIGS. 4 to 6 may be supplied by the driver 110 of FIG. 1.

As shown in FIG. 4, a reset signal RS may be supplied to the scan electrode Y during a reset period RP for initialization of at least one of a plurality of subfields of a frame. The reset signal RS may include a ramp-up signal RU with a gradually rising voltage and a ramp-down signal RD with a gradually falling voltage.

More specifically, the ramp-up signal RU may be supplied to the scan electrode Y during a setup period SU of the reset period RP, and the ramp-down signal RD may be supplied to the scan electrode Y during a set-down period SD following the setup period SU. The ramp-up signal RU may generate a weak dark discharge (i.e., a setup discharge) inside the discharge cells. Hence, the wall charges may be uniformly distributed inside the discharge cells. The ramp-down signal RD subsequent to the ramp-up signal RU may generate a weak erase discharge (i.e., a set-down discharge) inside the discharge cells. Hence, the remaining wall charges may be uniformly distributed inside the discharge cells to the extent that an address discharge occurs stably.

The ramp-up signal RU may include a first ramp-up signal RU1 and a second ramp-up signal RU2 each having a different voltage change rate over time. The first ramp-up signal RU1 may gradually rise from a ground level voltage GND to a fourth voltage V4 with a first voltage change rate, and the second ramp-up signal RU2 may gradually rise from the fourth voltage V4 to a third voltage V3 with a second voltage change rate less than the first voltage change rate. The first and second ramp-up signals RU1 and RU2 may further stabilize the setup discharge. More specifically, because the first and second ramp-up signals RU1 and RU2 rapidly raise a voltage before a generation of the setup discharge and relatively slowly raise the voltage immediately after the setup discharge occurs, an amount of light generated during the setup period SU may be reduced and also contrast characteristics may be improved.

The ramp-down signal RD may include a first ramp-down signal RD1 and a second ramp-down signal RD2 each having a different voltage change rate over time. The first ramp-down signal RD1 may gradually fall from a second voltage V2 to a fifth voltage V5 with a third voltage change rate, and the second ramp-down signal RD2 may gradually fall from the fifth voltage V5 to a sixth voltage V6 with a fourth voltage change rate whose a magnitude is less than a magnitude of the third voltage change rate. The first and second ramp-down signals RD1 and RF2 may further stabilize the set-down discharge and may reduce an amount of light generated during the set-down period SD. Hence, the contrast characteristics may be improved.

A predetermined period may be arranged between the setup period SU and the set-down period SD. During the predetermined period, the reset signal RS may rise to the third voltage V3 (i.e., a maximum voltage of the reset signal RS) and then may again rise to the second voltage V2 less than the maximum voltage V3. Hence, an erase discharge may occur in the discharge cells during the predetermined period, and thus an amount of wall charges remaining in the discharge cells may be reduced. The predetermined period may be referred to as an erase period.

During an erase period EP, the reset signal RS between the ramp-up signal RU and the ramp-down signal RD may fall to a first voltage V1, that is less than the maximum voltage V3 of the ramp-up signal RU and is greater than the ground level voltage GND, and then may rise to the second voltage V2, that is greater than the first voltage V1 and is less than the maximum voltage V3. Further, during the erase period EP, a first signal PS overlapping the reset signal RS may be supplied to the sustain electrode Z. The first signal PS has the same direction as the reset signal RS. Hence, an erase discharge occurs between the scan electrode Y and the sustain electrode Z, and thus an amount of wall charges remaining in the discharge cells may be reduced. Preferably, the first signal PS may overlap a period during which the voltage of the reset signal RS again rises.

If there in no erase period EP between the setup period SU and the set-down period SD, an amount of wall charges remaining in the discharge cells may excessively increase at an end of the reset period RP. In this case, even if a data signal is not supplied to the address electrode during an address period AP following the reset period RP, an address discharge may occur during the address period AP. Namely, an erroneous discharge occurs during the address period AP. As a result, because a sustain discharge may occur during a sustain period SP following the address period AP, the image quality may worsen.

On the other hand, as shown in FIG. 4, if an erase discharge occurs between the scan electrode Y and the sustain electrode Z during the erase period EP between the setup period SU and the set-down period SD, an erase discharge occurs in the discharge cells when an amount of wall charges excessively increase. Hence, an erroneous discharge may be prevented by reducing an excessive amount of wall charges.

Further, if a proper amount of wall charges remain in the discharge cells after the setup period SU, an erase discharge may not occur during the erase period EP.

In other words, if the erase period EP is arranged between the setup period SU and the set-down period SD, the erase discharge occurs during the erase period EP when an excessive amount of wall charges remain in the discharge cells at an end of the setup period SU. Hence, the excessive amount of wall charges may be reduced. Further, if a proper amount of wall charges remain in the discharge cells at the end of the setup period SU, the erase discharge does not occur even if the erase period EP is arranged. Hence, the generation of erroneous discharge may be prevented.

As shown in FIG. 5, a magnitude of the first voltage V1 in the erase period EP may be substantially equal to a voltage magnitude Vsc of a scan signal Sc supplied to the scan electrode Y in the address period AP. Further, the second voltage V2 in the erase period EP may be substantially equal to a voltage Vs of a sustain signal SUS supplied to the scan electrode Y and the sustain electrode Z in the sustain period SP. The maximum voltage V3 of the reset signal RS may be substantially equal to a sum (Vs+Vsc) of the voltage magnitude Vsc of the scan signal Sc and the voltage Vs of the sustain signal SUS. When the first, second, and third voltages V1, V2, V3 of the reset signal RS set as above, the number of voltage sources may be reduced. Hence, the manufacturing cost may be reduced.

As shown in FIG. 6, a voltage V7 of the first signal PS in (a) may be substantially equal to the voltage Vs of the sustain signal SUS in (b).

Further, because the sustain signal SUS is supplied using an energy recovery circuit including an inductor, the sustain signal SUS may include a voltage rising period d10 during which a voltage of the sustain signal SUS gradually rises, a voltage hold period d20 during which the sustain signal SUS is substantially held at the maximum voltage Vs, and a voltage falling period d30 during which the voltage of the sustain signal SUS gradually falls. The voltage rising period d10 may be referred to as an ER-Up period, and the voltage falling period d30 may be referred to as an ER-Down period.

Further, the first signal PS may be supplied using the energy recovery circuit used to generate the sustain signal SUS. Therefore, the first signal PS may include a voltage rising period d1 during which a voltage of the first signal PS gradually rises, a voltage hold period d2 during which the first signal PS is substantially held at the maximum voltage V7, and a voltage falling period d3 during which the voltage of the first signal PS gradually falls. A length and a voltage change rate of the voltage rising period d1 of the first signal PS may be substantially equal to a length and a voltage change rate of the voltage rising period d10 of the sustain signal SUS. In addition, a length and a voltage change rate of the voltage falling period d3 of the first signal PS may be substantially equal to a length and a voltage change rate of the voltage falling period d30 of the sustain signal SUS.

Referring again to FIG. 4, during the address period AP, a scan reference signal Ybias having a voltage greater than the minimum voltage V6 of the ramp-down signal RD may be supplied to the scan electrode Y. In addition, the scan signal Sc falling from the scan reference signal Ybias may be supplied to the scan electrode Y.

A pulse width of a scan signal supplied to the scan electrode during an address period of at least one subfield of a frame may be different from pulse widths of scan signals supplied during address periods of the other subfields of the frame. A pulse width of a scan signal in a subfield may be greater than a pulse width of a scan signal in a next subfield. For example, a pulse width of the scan signal may be gradually reduced in the order of 2.6 μs, 2.3 μs, 2.1 μs, 1.9 μs, etc. or may be reduced in the order of 2.6 μs, 2.3 μs, 2.3 μs, 2.1 μs, . . . , 1.9 μs, 1.9 μs, etc. in the successively arranged subfields.

As above, when the scan signal Sc is supplied to the scan electrode Y, a data signal Dt corresponding to the scan signal Sc may be supplied to the address electrode X. As a voltage difference between the scan signal Sc and the data signal Dt is added to a wall voltage obtained by the wall charges produced during the reset period RP, an address discharge may occur inside the discharge cell to which the data signal Dt is supplied. In addition, during the address period AP, a sustain reference signal Zbias may be supplied to the sustain electrode Z, so that the address discharge efficiently occurs between the scan electrode Y and the address electrode X.

During the sustain period SP, the sustain signal SUS may be supplied to at least one of the scan electrode Y or the sustain electrode Z. In FIG. 4, the sustain signal SUS is alternately supplied to the scan electrode Y and the sustain electrode Z. As the wall voltage inside the discharge cell selected by performing the address discharge is added to the sustain voltage Vs of the sustain signal SUS, every time the sustain signal SUS is supplied, a sustain discharge, i.e., a display discharge may occur between the scan electrode Y and the sustain electrode Z.

Figure 7:
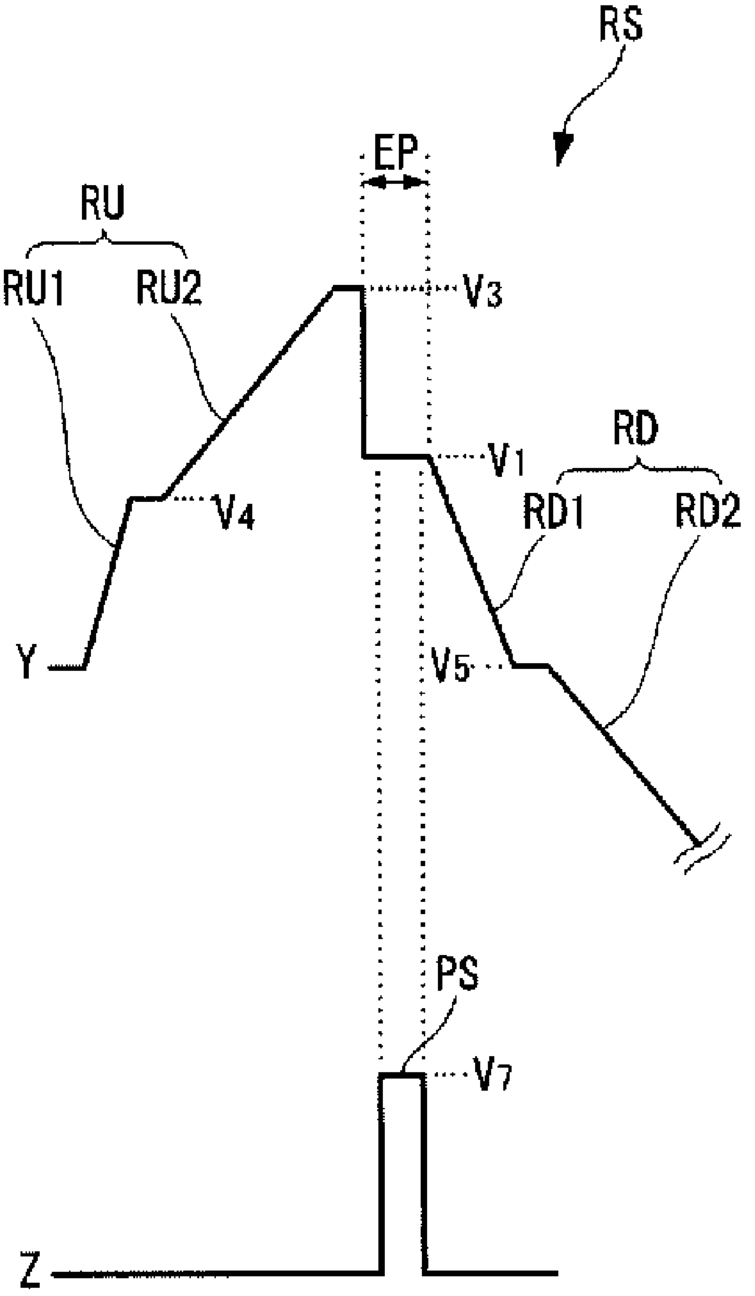
FIGS. 7 and 8 illustrate a voltage of a scan electrode in an erase period.
Figure 8:
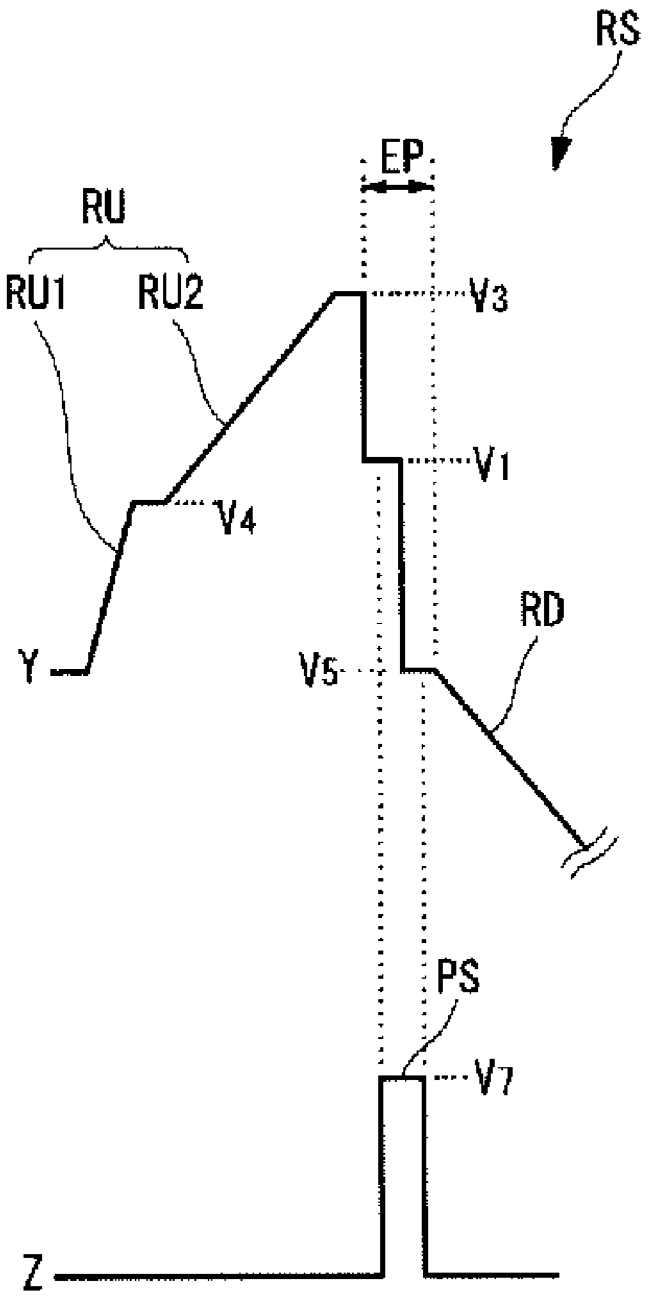

FIGS. 7 and 8 illustrate a voltage of the scan electrode in the erase period EP.

As shown in FIG. 7, when the first signal PS is supplied to the sustain electrode Z in the erase period EP, a voltage of the scan electrode Y is approximately held at the first voltage V1. The first voltage V1 is the same as the sustain voltage Vs.

In this case, because a voltage difference between the scan electrode Y and the sustain electrode Z in the erase period EP is relatively small, an intensity of the erase discharge excessively decreases or the erase discharge may not occur in the erase period EP. In FIG. 7, because the voltage of the first signal PS is the same as the sustain voltage Vs and the voltage of the scan electrode Y is the same as the sustain voltage Vs, the voltage difference between the scan electrode Y and the sustain electrode Z in the erase period EP is substantially 0 V. Hence, it is difficult to prevent the generation of erroneous discharge.

Further, as shown in FIG. 8, if a voltage of the scan electrode Y does not rise to the second voltage V2 greater than the first voltage V1 and falls from the first voltage V1 to the fifth voltage V5 substantially equal to the ground level voltage GND in the erase period EP, an excessive amount of wall charge may be erased during the erase period EP. In this case, a voltage margin may worsen because of an insufficient amount of wall charges. Further, even if the data signal is supplied during the address period, the address discharge may not occur because of the insufficient amount of wall charges.

On the other hand, as shown in FIG. 4, in the erase period EP, a voltage of the scan electrode Y falls to the first voltage V1, that is less than the maximum voltage V3 of the ramp-up signal RU and is greater than the ground level voltage GND, and then rises from the first voltage V1 to the second voltage V2 less than the maximum voltage V3. Further, the first signal PS is supplied to the sustain electrode Z while the voltage of the scan electrode Y rises to the second voltage V2. Hence, the generation of erroneous discharge and a reduction in a voltage margin may be prevented by properly erasing the wall charges remaining in the discharge cells.

FIGS. 9 to 12 illustrate a drive timing in the erase period EP.

Figure 9:
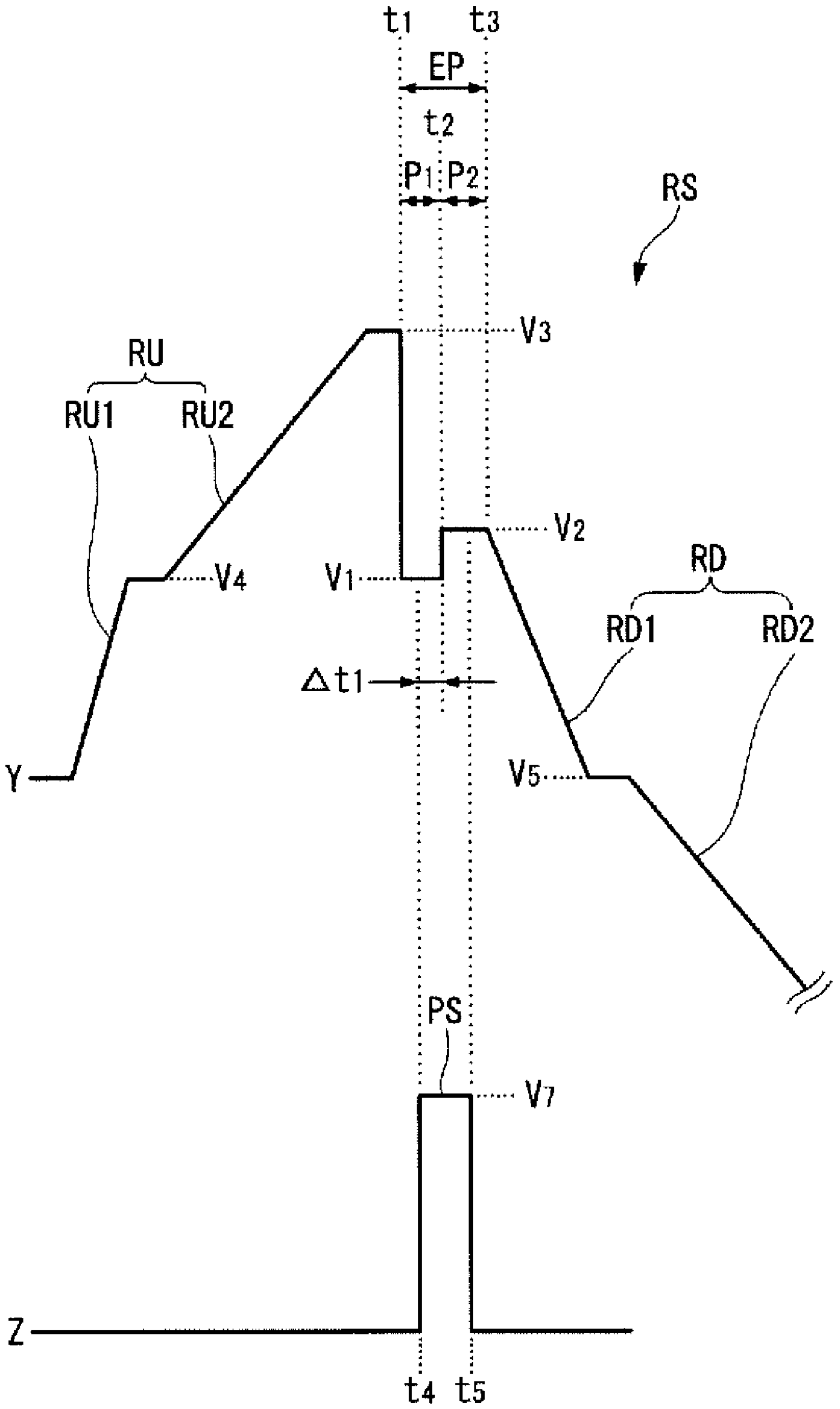
FIGS. 9 to 12 illustrate a drive timing in an erase period.

The first signal PS may not overlap at least one of the ramp-up signal RU and the ramp-down signal RD. In FIG. 9, the first signal PS does not overlap both the ramp-up signal RU and the ramp-down signal RD. More specifically, the voltage of the scan electrode Y may be held at the first voltage V1 during a first hold period P1 of the erase period EP and may be held at the second voltage V2 during a second hold period P2 of the erase period EP. In this case, the first signal PS may overlap the first and second hold periods P1 and P2.

In FIG. 9, t1 indicates a start time point of the first hold period P1, t2 an end time point of the first hold period P1, t3 an end time point of the second hold period P2, t4 a start time point of the first signal PS, and t5 an end time point of the first signal PS. Namely, the start time point t4 between the time points t1 and t2 is later than the start time point t1 of the first hold period P1, and the end time point t5 between the time points t2 and t3 is earlier than the end time point t2 of the second hold period P2.

A hold time of an erase discharge, i.e., a time interval Δt1 between the time points t4 and t2 may be adjusted so that a sufficient amount of wall charges are erased through the erase discharge.

Figure 10:
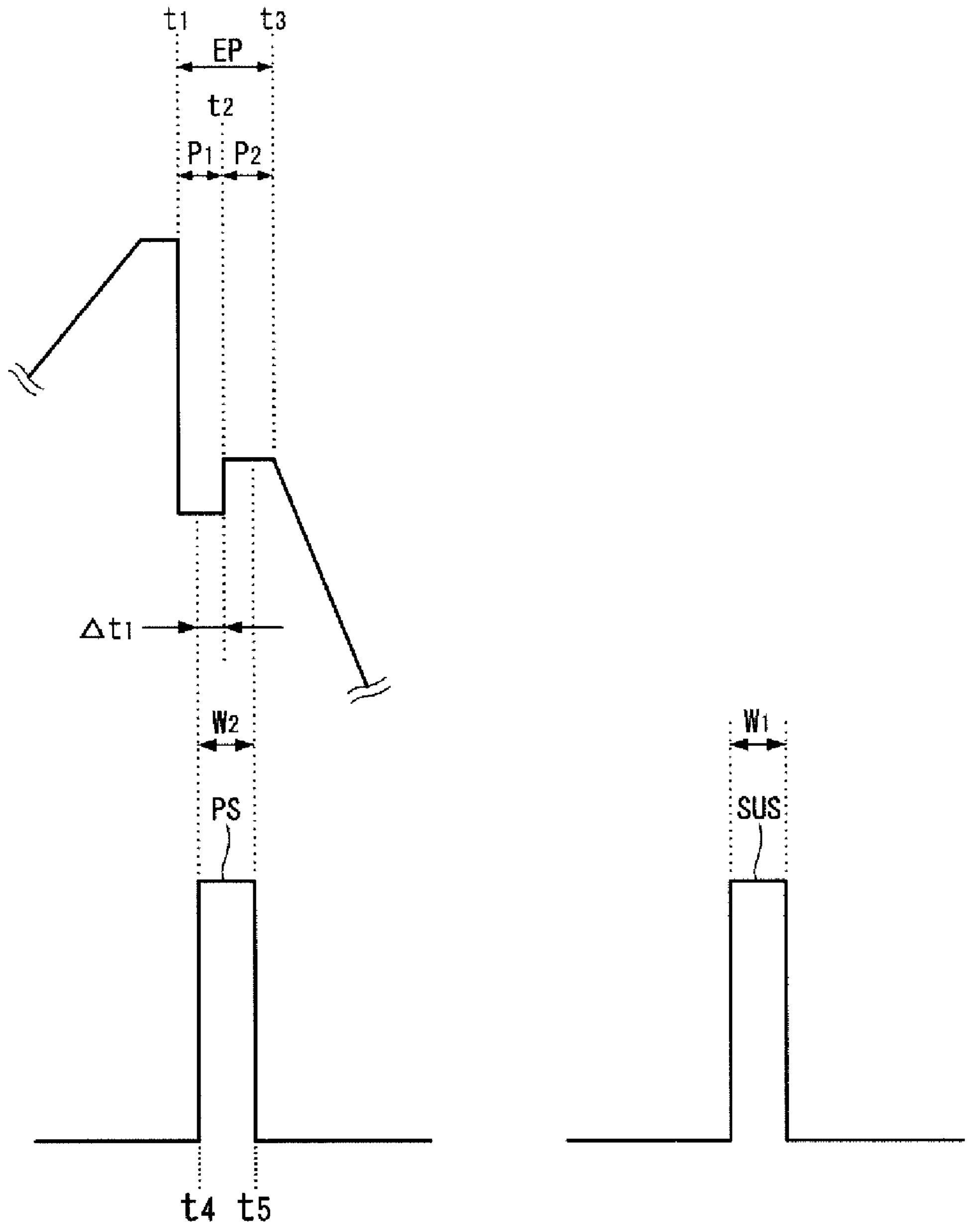

More specifically, as shown in FIG. 10, a time interval Δt1 between the time points t4 and t2 in (a) may be less than a pulse width W1 of the sustain signal SUS in (b), so that a sufficient amount of wall charges are erased through the erase discharge. In this case, a hold time of the erase discharge in the erase period EP may be relatively short. Hence, a weak erase discharge may instantaneously occur, and the wall charges may be erased in the discharge cells through the weak erase discharge.

A pulse width W2 of the first signal PS may variously change on condition that a hold time of the erase discharge (i.e., the time interval Δt1) is less than the pulse width W1 of the sustain signal SUS. For example, the pulse width W2 of the first signal PS may be greater or less than the pulse width W1 of the sustain signal SUS. Otherwise, the pulse width W2 of the first signal PS may be substantially equal to the pulse width W1 of the sustain signal SUS.

Figures 11, 12:
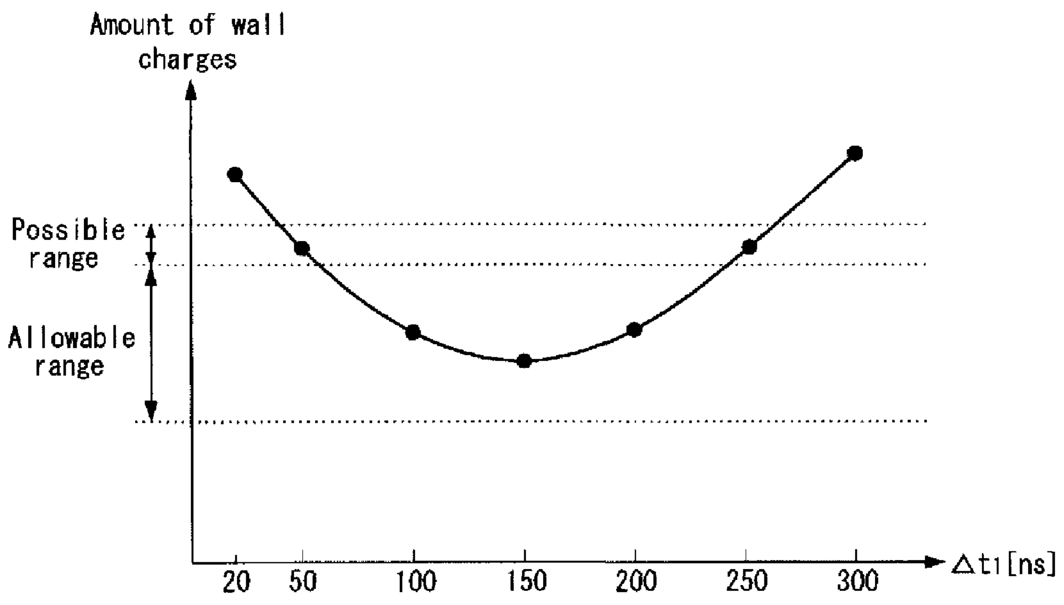

FIGS. 11 and 12 are a table and a graph illustrating a relationship between the time interval Δt1 between the time points t4 and t2 and an amount and a driving time of wall charges remaining in the discharge cells. The amount of wall charges remaining in the discharge cells were indirectly measured by a wall voltage of the discharge cells. In FIG. 11, X, ○, and □ in the amount of wall charges and the driving time represent bad, good, and excellent states of the characteristics, respectively.

The driving time characteristic was estimated by deciding whether or not sufficient time required to drive the plasma display apparatus is secured as a length of the time interval Δt1 in a set driving waveform increases. In the driving time characteristic, □ indicates an excellent state because the sufficient driving time is secured; ○ indicates a good state; and X indicates a bad state, in which it is difficult to secure the driving time because the length of the time interval Δt1 excessively increases in the erase period.

When the length of the time interval Δt1 is about 20 ns, the characteristic of the amount of wall charges erased in the erase period represents the bad state. In this case, because the length of the time interval Δt1 is excessively short (i.e., the hold time of the erase discharge is excessively short), the excessively small amount of wall charges may be erased in the erase period or an erase discharge may not occur in the erase period.

On the other hand, when the length of the time interval Δt1 is about 100 ns to 200 ns, the characteristic of the amount of wall charges represents the excellent state. In this case, the sufficient amount of wall charges may be erased in the erase period because of the proper length of the time interval Δt1.

Further, when the length of the time interval Δt1 is about 50 ns or 250 ns, the characteristic of the amount of wall charges erased in the erase period represents the good state.

When the length of the time interval Δt1 is about 300 ns to 400 ns, the characteristic of the amount of wall charges erased in the erase period represents the bad state. In this case, as the length of the time interval Δt1 excessively increases, the amount of wall charges erased by the erase discharge occurring in the erase period may decrease. As the length of the time interval Δt1 more excessively increases, the amount of wall charges may increase subsequent to the erase discharge.

FIG. 12 illustrates a relationship between the length of the time interval Δt1 and the amount of wall charges remaining in the discharge cells after the erase period.

When the length of the time interval Δt1 is about 20 ns or 300 ns, the excessively large amount of wall charges may remain in the discharge cells after the erase period because the excessively small amount of wall charges are erased in the erase period. Hence, even if the data voltage is not supplied, the address discharge may occur.

When the length of the time interval Δt1 is about 100 ns to 200 ns, the amount of wall charges remaining in the discharge cells after the erase period is within an allowable range because the sufficient amount of wall charges are erased in the erase period.

When the length of the time interval Δt1 is about 50 ns or 250 ns, the sufficient amount of wall charges are not erased in the erase period. However, the amount of wall charges remaining in the discharge cells after the erase period is within a possible range.

When the length of the time interval Δt1 is equal to or greater than about 400 ns, the driving time characteristic represents the bad state. In this case, the driving time may be insufficient because of the excessively long length of the time interval Δt1.

When the length of the time interval Δt1 is about 20 ns to 250 ns, the driving time characteristic represents the excellent state. In this case, the driving time may be easily secured because of the sufficiently short length of the time interval Δt1.

When the length of the time interval Δt1 is about 300 ns, the driving time characteristic represents the good state.

Considering the descriptions of FIGS. 11 and 12, the hold time of the erase discharge, i.e., the time interval Δt1 between the start time point t4 of the first signal and the start time point t2 of the second hold period may be about 50 ns to 250 ns, and preferably, may be about 100 ns to 200 ns.

Figure 13:
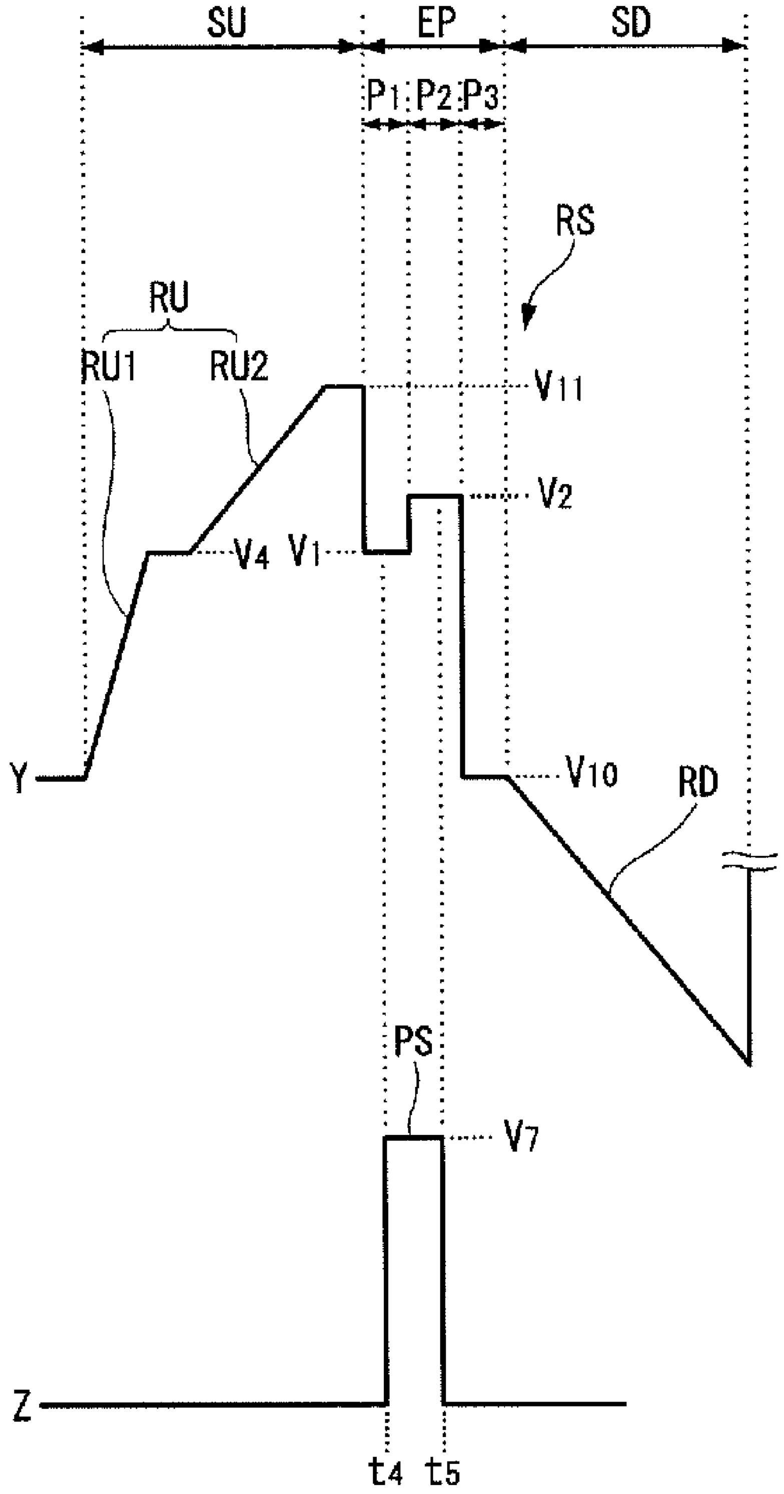
FIG. 13 illustrates another form of a reset signal.

FIG. 13 illustrates another form of the reset signal.

As shown in FIG. 13, a ramp-down signal RD does not fall from a second voltage V2. In an erase period EP, a voltage of a reset signal RS may fall from the second voltage V2 to a tenth voltage V10, and then a ramp-down signal RD falling from the tenth voltage V10 may be supplied.

More specifically, the erase period EP in which an erase discharge occurs in the discharge cells to reduce an amount of wall charges may include a first hold period P1 during which the reset signal RS is held at a first voltage V1, a second hold period P2 during which the reset signal RS is held at the second voltage V2, and a third hold period P3 during which the reset signal RS is held at the tenth voltage V10 less than the first voltage V1. The ramp-down signal RD may fall from an end of the third hold period P3, i.e., the tenth voltage V10. In this case, the tenth voltage V10 may be substantially equal to the ground level voltage. In this case, an erase discharge may occur between the scan electrode and the sustain electrode by supplying a first signal PS to the sustain electrode in the erase period EP.

A maximum voltage of the reset signal RS shown in FIG. 13, i.e., a maximum voltage V11 of a ramp-up signal RD may be less than the maximum voltage V3 of the reset signal RS shown in FIG. 4.

Figure 14:
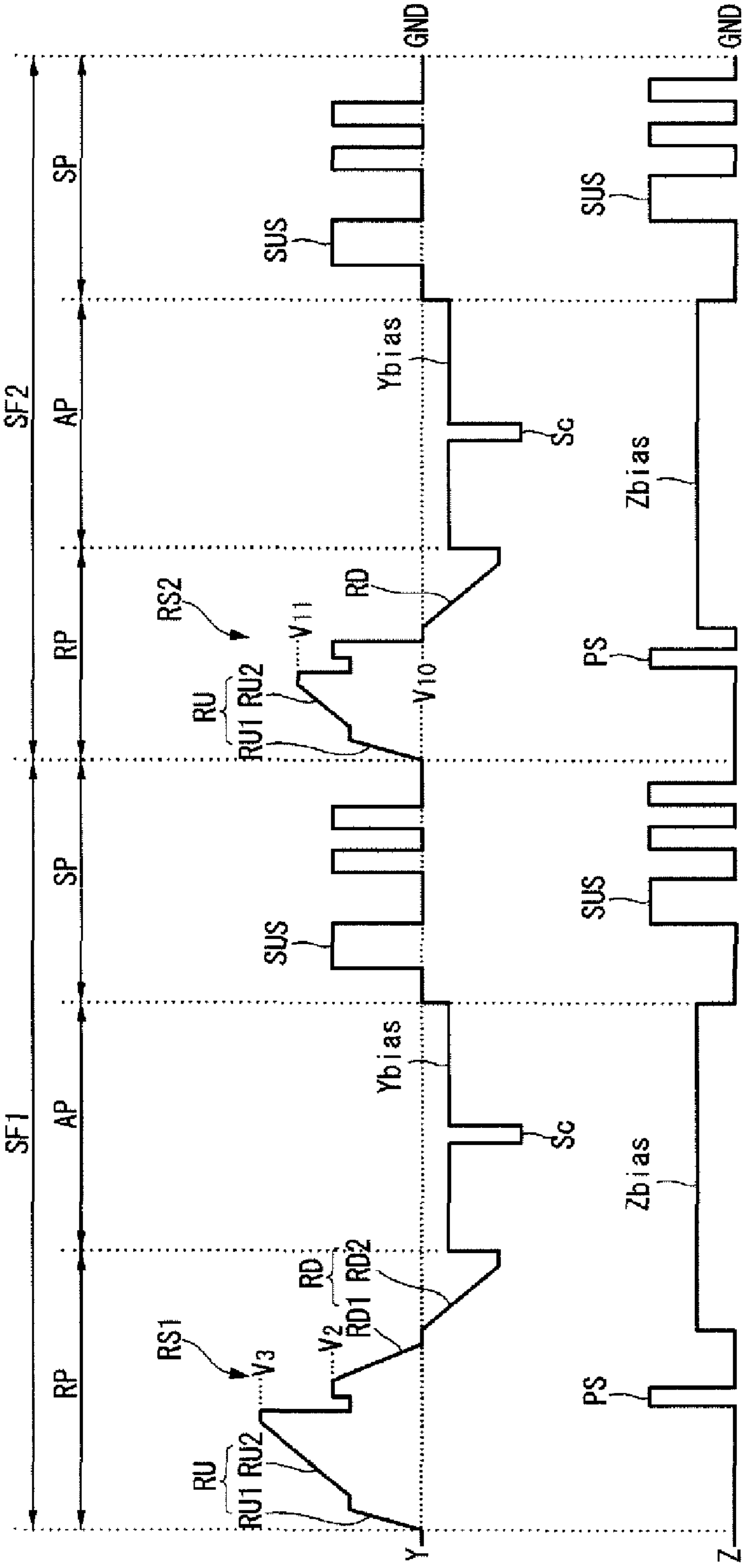
FIG. 14 illustrates that a first reset signal and a second reset signal are used together.

FIG. 14 illustrates that a first reset signal and a second reset signal are used together.

As shown in FIG. 14, the reset signal RS shown in FIG. 4 may be used in a first subfield SF1 of a plurality of subfields, and the reset signal RS shown in FIG. 13 may be used in a second subfield SF2 subsequent to the first subfield SF1. A gray weight value (i.e., the number of sustain signals supplied during a sustain period) in the second subfield SF2 may be greater than that in the first subfield SF1.

The reset signal RS shown in FIG. 4 supplied in the first subfield SF1 is referred to as a first reset signal RS1, and the reset signal RS shown in FIG. 13 supplied in the second subfield SF2 is referred to as a second reset signal RS2. A maximum voltage V3 of the first reset signal RS1 may be greater than a maximum voltage V11 of the second reset signal RS2. Further, a maximum voltage V2 of a ramp-down signal RD of the first reset signal RS1 may be greater than a maximum voltage V10 of a ramp-down signal RD of the second reset signal RS2.

In other words, the ramp-down signal RD of the first reset signal RS1 in the first subfield SF1 may fall from a second voltage V2 less than the maximum voltage V3 of the first reset signal RS1, and the ramp-down signal RD of the second reset signal RS2 in the second subfield SF2 may fall from the ground level voltage GND.

As above, because the second reset signal RS2, whose the maximum voltage V11 is less than the maximum voltage V3 of the first reset signal RS1, is supplied in the second subfield SF2, in which the number of sustain signals is more than that in the first subfield SF1, and the first reset signal RS1 is supplied in the first subfield SF1, the wall charges are uniformly distributed in the first subfield SF1 because of the first reset signal RS1 having the relatively higher maximum voltage V3. Hence, the entire discharge may be stabilized. Further, even if the maximum voltage V11 of the second reset signal RS2 supplied in the second subfield SF2 subsequent to the first subfield SF1 is lowered, the entire discharge in the second subfield SF2 may be stabilized.

In this case, the first signal PS in each of the first and second subfields SF1 and SF2 may overlap a period in which voltages of the first and second reset signals RS1 and RS2 rise to the maximum voltages V3 and V11 and then again rise to voltages less than the maximum voltages V3 and V11.

Figure 15:
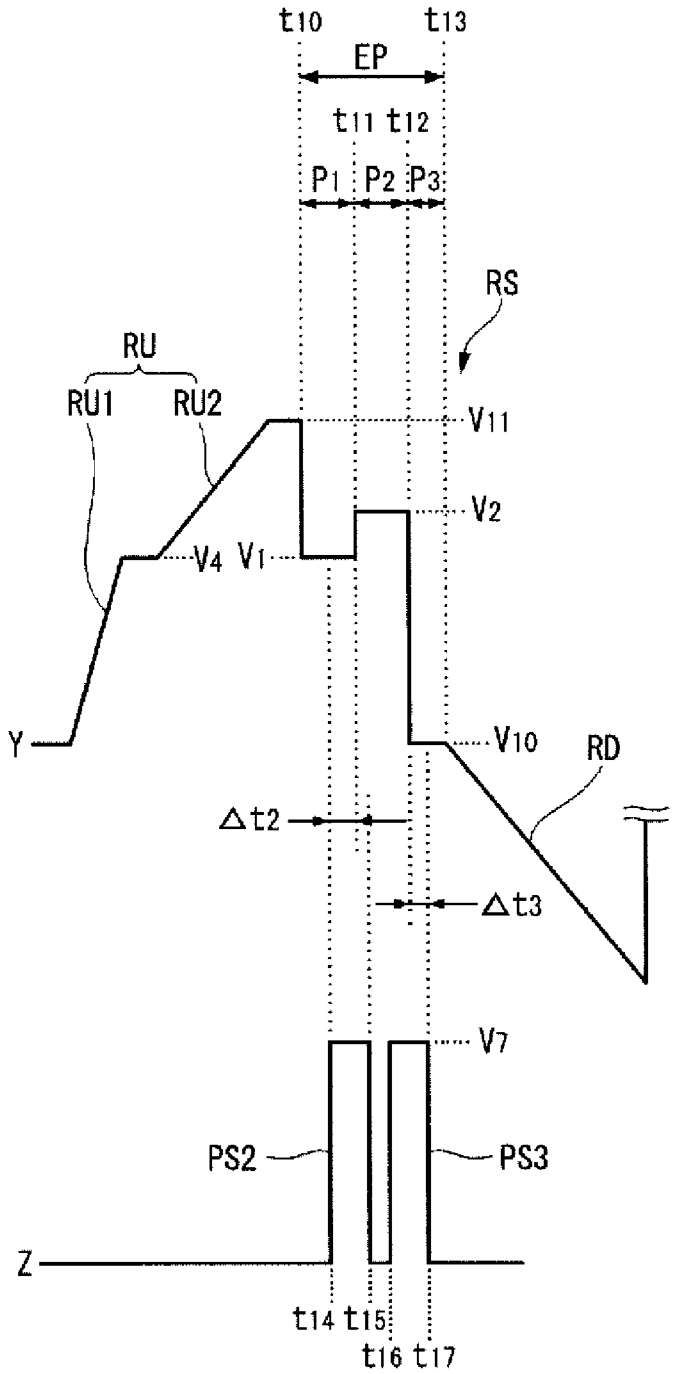
FIG. 15 illustrates that a plurality of first signals are supplied.

FIG. 15 illustrates that a plurality of first signals are supplied.

As shown in FIG. 15, a first signal may include a second signal PS2 and a third signal PS3 that are spaced apart from each other at a predetermined time interval.

An erase period EP may include a first hold period P1 during which a voltage of a reset signal RS is held at a first voltage V1, a second hold period P2 during which the voltage of the reset signal RS is held at a second voltage V2, and a third hold period P3 during which the voltage of the reset signal RS falls from the second voltage V2 to a tenth voltage V10 (i.e., the ground level voltage GND) and then is held at the tenth voltage V10.

The second signal PS2 may overlap the first hold period P1 and the second hold period P2, and the third signal PS3 may overlap the second hold period P2 and the third hold period P3.

In FIG. 15, t10 indicates a start time point of the first hold period P1, t11 an end time point of the first hold period P1 and a start time point of the second hold period P2, t12 an end time point of the second hold period P2 and a start time point of the third hold period P3, t13 an end time point of the third hold period P3, t14 a start time point of the second signal PS2, t15 an end time point of the second signal PS2, t16 a start time point of the third signal PS3, and t17 an end time point of the third signal PS3. Further, the time point t14 exists between the time points t10 and t11, the time points t15 and t16 exist between the time points t11 and t12, and the time point t17 exists between the time points t12 and t13.

In this case, a hold time of an erase discharge exists between the time points t14 and t11 and between the time points t12 and t17. Namely, a voltage difference between the scan electrode and the sustain electrode increases at the time point t14 of the erase period EP, and thus an erase discharge first occurs. Then, a voltage difference between the scan electrode and the sustain electrode increases at the time point t12 of the erase period EP, and thus an erase discharge secondly occurs. In this case, the wall charges in the discharge cells may be erased more stably.

Further, the hold time of the erase discharge, i.e., a length of a time interval Δt2 between the time points t14 and t11 and a length of a time interval Δt3 between the time points t12 and t17 may be approximately 50 ns to 250 ns, and preferably, may be approximately 100 ns to 200 ns as illustrated in FIGS. 11 and 12. The length of the time interval Δt2 and the length of the time interval Δt3 may be less than a pulse width of a sustain signal supplied to at least one of the scan electrode and the sustain electrode in the sustain period.

The reset signal RS illustrated in FIG. 15 may be substantially the same as the second reset signal RS2 illustrated in FIG. 14. Accordingly, one first signal PS illustrated in FIG. 14 may be supplied during a reset period of a first subfield of a plurality of subfields, and two first signals PS2 and PS3 illustrated in FIG. 15 may be supplied during a reset period of a second subfield following the first subfield.

As above, the number of first signals supplied in reset periods of two subfields of a plurality of subfields may be different from each other. Preferably, the number of first signals in one subfield of a plurality of subfields may be less than the number of first signals in a subfield following the one subfield (or a subfield whose a gray weight value is greater than a gray weight value of the one subfield).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A plasma display apparatus comprising:

a plasma display panel including a scan electrode and a sustain electrode that are positioned parallel to each other, and an address electrode crossing the scan electrode and the sustain electrode; and a driver configured to supply a reset signal to the scan electrode and a first signal, a direction of which is the same as a direction of the reset signal, the sustain electrode in a reset period of at least one of a plurality of subfields of a frame, wherein the first signal overlaps a predetermined period during which the reset signal rises to a maximum voltage and then again rises to a voltage less than the maximum voltage, wherein the reset signal falls from the maximum voltage to a first voltage greater than a ground level voltage and then again rises to a second voltage that is greater than the first voltage and is less than the maximum voltage in the predetermined period, and wherein a magnitude of the first voltage is substantially equal to a voltage magnitude of a scan signal supplied to the scan electrode in an address period following the reset period.

2. The plasma display apparatus of claim 1, wherein the reset signal includes a ramp-up signal, a voltage of which gradually rises in a setup period of the reset period, and a ramp-down signal, a voltage of which gradually falls in a set-down period following the setup period, wherein the predetermined period is arranged between the ramp-up signal and the ramp-down signal.

3. The plasma display apparatus of claim 2, wherein the first signal does not overlap at least one of the ramp-up signal and the ramp-down signal.

4. The plasma display apparatus of claim 1, wherein the second voltage is substantially equal to a voltage of a sustain signal supplied to at least one of the scan electrode and the sustain electrode in a sustain period after the reset period.

5. The plasma display apparatus of claim 1, wherein an amount of wall charges distributed in a discharge cell formed in an area where the address electrode crosses the scan electrode and the sustain electrode decrease in the predetermined period.

6. The plasma display apparatus of claim 1, wherein a voltage of the first signal is substantially equal to a voltage of a sustain signal supplied to at least one of the scan electrode and the sustain electrode in a sustain period after the reset period.

7. The plasma display apparatus of claim 1, wherein the reset signal is held at the first voltage during a first hold period, and the reset signal is held at the second voltage during a second hold period, wherein the first signal overlaps the first hold period and the second hold period.

8. The plasma display apparatus of claim 7, wherein a start time point of the first signal is later than a start time point of the first hold period, and an end time point of the first signal is earlier than an end time point of the second hold period.

9. The plasma display apparatus of claim 8, wherein a time interval between the start time point of the first signal and a start time point of the second hold period is approximately 100 ns to 200 ns.

10. The plasma display apparatus of claim 9, wherein a length of the time interval is smaller than a pulse width of a sustain signal supplied to at least one of the scan electrode and the sustain electrode in a sustain period after the reset period.

11. The plasma display apparatus of claim 1, wherein the reset signal is held at the first voltage during a first hold period and is held at the second voltage during a second hold period, wherein the reset signal falls from the second voltage to the ground level voltage and then is held at the ground level voltage during a third hold period, wherein the first signal includes a second signal overlapping the first hold period and the second hold period and a third signal overlapping the second hold period and the third hold period.

12. The plasma display apparatus of claim 11, wherein a time interval between a start time point of the second signal and a start time point of the second hold period and a time interval between a start time point of the third hold period and an end time point of the third signal are approximately 100 ns to 200 ns.

13. The plasma display apparatus of claim 11, wherein a length of a time interval between a start time point of the second signal and a start time point of the second hold period and a length of the time interval between a start time point of the third hold period and an end time point of the third signal are smaller than a pulse width of a sustain signal supplied to at least one of the scan electrode and the sustain electrode in a sustain period after the reset period.

14. A plasma display apparatus comprising:

a plasma display panel including a scan electrode and a sustain electrode that are positioned parallel to each other, and an address electrode crossing the scan electrode and the sustain electrode; and a driver configured to supply:

a first reset signal to the scan electrode and a first signal, a direction of which is the same as a direction of the first reset signal, to the sustain electrode in a reset period of a first subfield of a plurality of subfields of a frame, and a second reset signal, a voltage magnitude of which is smaller than a voltage magnitude of the first reset signal, to the scan electrode and the first signal, the direction of which is the same as a direction of the second reset signal, to the sustain electrode in a reset period of a second subfield following the first subfield, wherein the first signal overlaps a predetermined period during which each of the first and second reset signals rises to a maximum voltage and then again rises to a voltage less than the maximum voltage, wherein the reset signal falls from the maximum voltage to a first voltage greater than a ground level voltage and then again rises to a second voltage that is greater than the first voltage and is less than the maximum voltage in the predetermined period, and wherein a magnitude of the first voltage is substantially equal to a voltage magnitude of a scan signal supplied to the scan electrode in an address period following the reset period.

15. The plasma display apparatus of claim 14, wherein a number of first signals supplied in the reset period of the first subfield is different from a number of first signals supplied in the reset period of the second subfield.

16. The plasma display apparatus of claim 15, wherein the number of first signals supplied in the reset period of the first subfield is less than the number of first signals supplied in the reset period of the second subfield.

17. A plasma display apparatus comprising:

a plasma display panel including a scan electrode and a sustain electrode that are positioned parallel to each other, and an address electrode crossing the scan electrode and the sustain electrode; and a driver configured to supply a reset signal to the scan electrode and supplies a first signal overlapping the reset signal to the sustain electrode in a reset period of at least one of a plurality of subfields of a frame, wherein the reset signal includes a ramp-up signal, a voltage of which gradually rises in a setup period of the reset period, and a ramp-down signal, a voltage of which gradually falls in a set-down period following the setup period, wherein an erase period is arranged between the setup period and the set-down period, wherein during the erase period, the reset signal falls to a first voltage, which is less than a maximum voltage of the ramp-up signal and is greater than a ground level voltage, and then again rises to a second voltage less than the maximum voltage of the ramp-up signal, wherein the first signal overlaps the erase period, and wherein a magnitude of the first voltage is substantially equal to a voltage magnitude of a scan signal supplied to the scan electrode in an address period following the reset period.

* * * * *